(12) United States Patent
Helfet

(10) Patent No.: US 7,601,258 B1
(45) Date of Patent: Oct. 13, 2009

(54) AQUARIUM FILTER WATER RETURN CHAMBER

(76) Inventor: Leon Helfet, 1539 San Rafael Way, Camarillo, CA (US) 93012

( * ) Notice: Subject to any disclaimer, the term of this patent is extended or adjusted under 35 U.S.C. 154(b) by 0 days.

(21) Appl. No.: 12/008,382

(22) Filed: Jan. 9, 2008

Related U.S. Application Data

(60) Provisional application No. 60/879,520, filed on Jan. 10, 2007.

(51) Int. Cl.
*A01K 63/04* (2006.01)
(52) U.S. Cl. .............. 210/167.22; 210/167.27; 210/416.2; 119/259; 119/260
(58) Field of Classification Search ........... 210/167.21, 210/167.22, 167.27, 232, 416.1, 416.2; 119/259, 119/260
See application file for complete search history.

(56) References Cited

U.S. PATENT DOCUMENTS

| | | | | |
|---|---|---|---|---|
| 4,024,064 A | * | 5/1977 | Rakowicz et al. | 210/258 |
| 4,684,462 A | * | 8/1987 | Augustyniak | 210/97 |
| 5,316,670 A | * | 5/1994 | Yao | 210/167.21 |
| 5,626,747 A | * | 5/1997 | Ritzow et al. | 210/167.21 |
| 6,706,176 B1 | | 3/2004 | Goldman | |
| 6,869,530 B1 | | 3/2005 | Venezia | |
| 7,416,659 B2 | * | 8/2008 | Newman | 210/167.27 |

FOREIGN PATENT DOCUMENTS

JP 64-70116 * 3/1989

* cited by examiner

*Primary Examiner*—Fred Prince
(74) *Attorney, Agent, or Firm*—Sandy Lipkin

(57) ABSTRACT

An improved water return system for water reservoirs such as aquariums and ponds that provides a return of filtered water through a series of holes rather than a curved weir or spillway. The use of the holes provides for high oxygenation of the water prior to its return to the water reservoir to the benefit of life in the water reservoir. Further, the use of the holes provides reduced noise upon the return of the water because of the surface tensions attracting adjacent streams to each other. Also, placement of the holes provides a damming effect for the filter media that can become a site for the cultivation of beneficial bacteria that are necessary to remove ammonia and nitrites from the water by positioning the media mostly out of water, thereby allowing necessary oxygen to be freely available to grow bacteria.

10 Claims, 3 Drawing Sheets

AQUARIUM FILTER WATER RETURN CHAMBER

REFERENCE TO PRIOR APPLICATION

This application claims the priority of provisional application 60/879,520, filed Jan. 10, 2007 entitled AQUARIUM FILTER WATER RETURN CHAMBER DESIGN WITH MULTIPLE HOLES THAT INCREASE VELOCITY OF RETURNING WATER AND CREATE A PLEASING CASCADE APPEARANCE by Leon Helfet.

BACKGROUND OF THE INVENTION

1. Field of the Invention

The field of this invention relates generally to the field of aquarium filters and more specifically to an improved design that provides for a unique, beneficial system for the return of the filtered water to a body of water, such as an aquarium or a pond.

2. Description of the Prior Art

Water reservoirs of all types, such as aquariums and ponds, are kept by hobbyists and others who wish to incorporate the beauty, serenity and tranquility of marine life into their surroundings. In order to accomplish this, conditions in the water reservoir must be optimized to allow for the flourishing of life therein. Accordingly, the water must be filtered. The filtration of the water seeks to improve the environment and appearance of the water therein as well as to promote the healthy needs of fish, animals, plants and invertebrates housed therein.

Typically, and most simply, water is removed from the reservoir using a pump. The water travels through a variety of filters: a mechanical filter to remove solid waste, a biological filter to maintain optimal bacterial levels and a chemical filter to remove harmful chemicals that are the byproducts of the system and/or found originally in the water. Once the water is removed from the reservoir and passed through each filter media, it is then typically returned to the reservoir over a weir or spillway, which is exposed to ambient oxygen, as it forms a planar stream of water.

The return of water through such a weir or spillway has some drawbacks. First, the planar flow of the water returning from the filter has minimal surface exposure to oxygen. Submerged plants and animals require as much oxygen as possible be dissolved into the water reservoir. It is advantageous, therefore, to provide a means for returning the filtered water to the reservoir in a manner that maximizes surface area exposure to ambient oxygen for the benefit of all life found therein.

Secondly, the flow of water over a weir or spillway can become noisy once the level of water reservoir falls below the level of the weir. It is therefore advantageous to provide a means of returning filtered water to the water reservoir in such a way as to reduce, minimize and/or eliminate the noise associated with the return of water found in a conventional weir.

It is the object of the instant invention to overcome the shortcomings of the prior art and provide a return system of filtered water to a water reservoir that provides for maximum oxygen exposure of the water, reduces the noise of returning water and that provides an aesthetically pleasing look as the water returns to the reservoir.

SUMMARY OF THE INVENTION

The basic embodiment of the present invention teaches an improved filter for water removed from a reservoir containing life such as fish, animals, invertebrates and plants comprising an outer casing, the outer casing have a base, two sidewalls, a front wall, a back wall and an open top; a pump located inside of the outer casing; filter media located inside of the outer casing; an inlet through which the power of the pump removes water from the reservoir for passage through the filter media inside of the outer casing; and a row of a plurality of apertures, each of the plurality of apertures being substantially congruent in size, located on the front wall.

The above embodiment can be further modified by defining that the filter media is permanently affixed to the outer casing.

The above embodiment can be further modified by defining that the filter media includes one or more media taken from the group comprising chemical media, biological media, mechanical media and ammonia adsorbing media.

The above embodiment can be further modified by defining that the filter further comprises at least one more plurality of apertures, each of the additional plurality of apertures being substantially congruent in size located parallel to the first row of plurality of apertures in an orientation such that the additional plurality of apertures are placed in a staggered position relative to the first plurality of apertures.

The above embodiment can be further modified by defining that the plurality of apertures are aligned substantially vertically.

The above embodiment can be further modified by defining that the plurality of apertures are aligned substantially horizontally.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
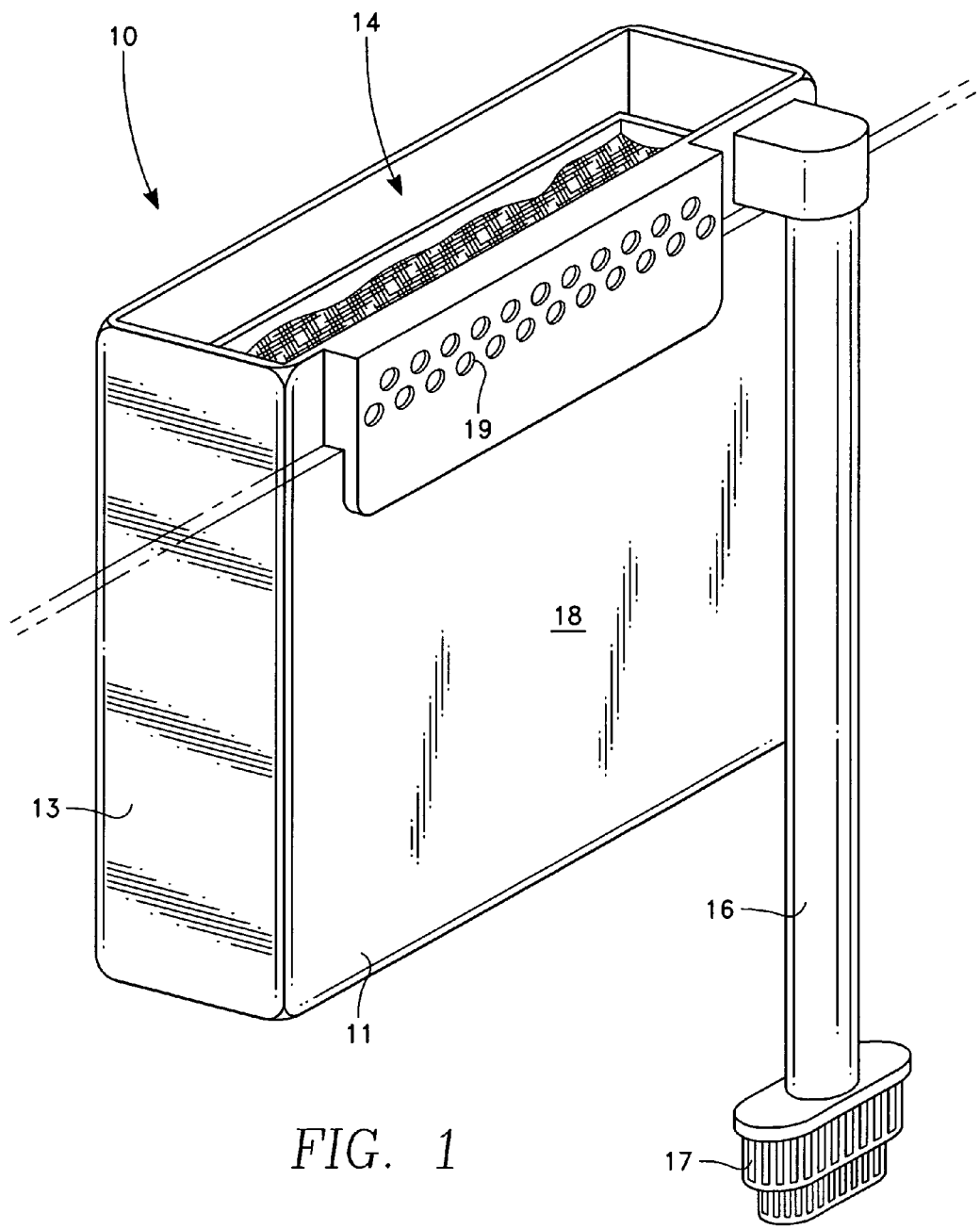
FIG. 1 is a perspective view of the preferred embodiment of the instant invention with two rows of return holes.

Turning to the drawings, the preferred embodiment is illustrated and described by reference characters that denote similar elements throughout the several views of the instant invention.

The preferred embodiment shows an aquarium filter 10 with an outer casing 11 having a front wall 18, back wall (not shown), a left side 13 and a right side (not shown). There is a bottom (not shown) and an open top 14. Included inside the casing 11 are filter media components that are considered conventional.

Inside the casing 11 there is found a pump, a mechanical filter, a chemical filter and a biological filter. On the outside of the casing 11 is attached an intake tube 16. Water is taken up through the intake tube 16 through a tip 17 that is preferably slotted to prevent large items from clogging the tube 16. The pump pulls water through the tip 17 and up the intake tube 16 and into the interior of the casing 11. The water travels through a variety of media types before being returned to the water reservoir. These media can include chemical media, biological media, mechanical media and ammonia adsorption media.

On the front 18 of the casing 11 located near the top is a plurality of holes 19 through which the filtered water returns to the water reservoir.

Figure 2:
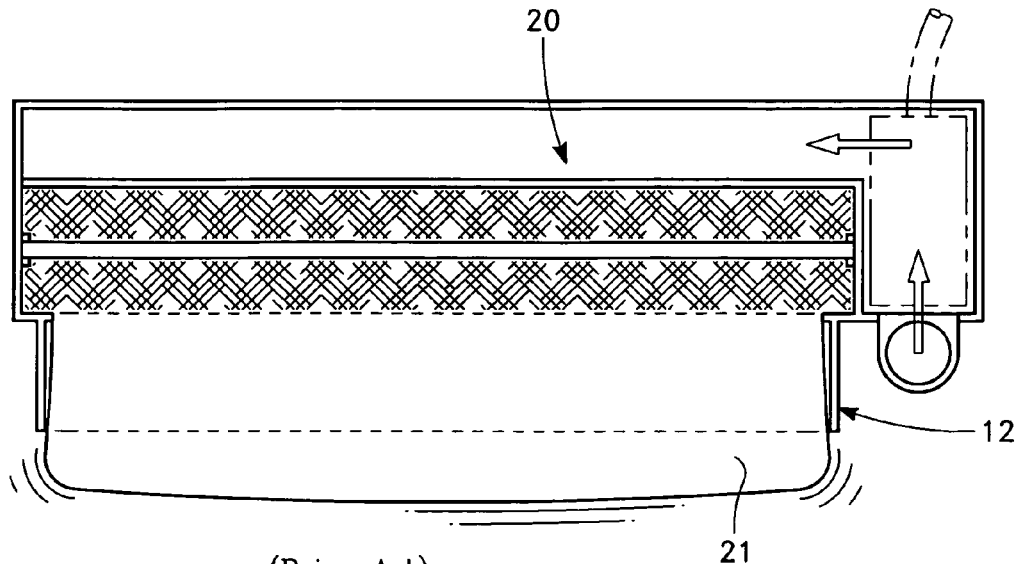
FIG. 2 is a top view of the prior art return mechanism utilizing a weir or a spillway.
Figure 3:
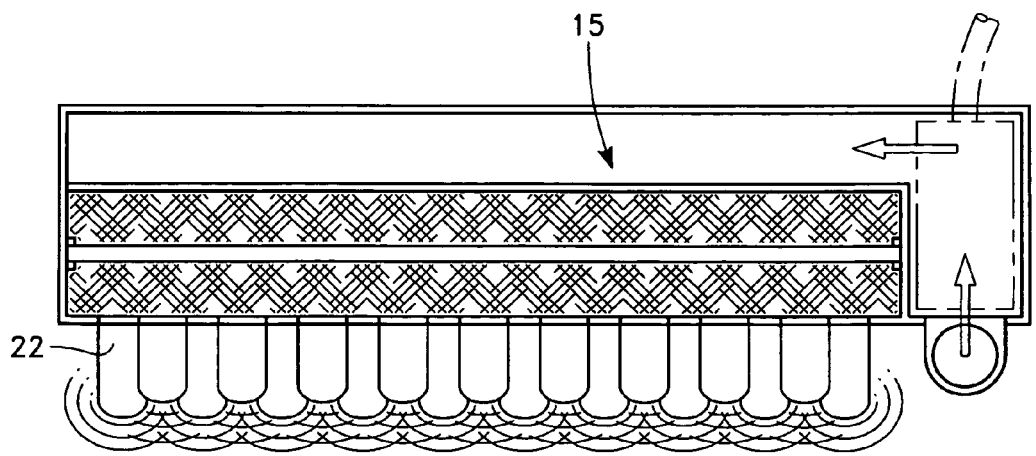
FIG. 3 is a top view of the instant invention utilizing the plurality of holes return mechanism.

As can be seen in FIG. 2, a prior art system 20 includes a weir or spillway 12 that returns a long stream 21 of water that has exposure to oxygen at the surface points of the water stream. In FIG. 3, the difference between the prior art 20 return of water and the instant invention is illustrated. The water returns to the reservoir through the plurality of holes 19 creating a plurality of streams 22. Through the creation of these multiple streams of water, the surface area of the water being returned is increased. By dividing the water into small streams, the irritating splash noise created by a larger stream is significantly reduced.

Figure 4:
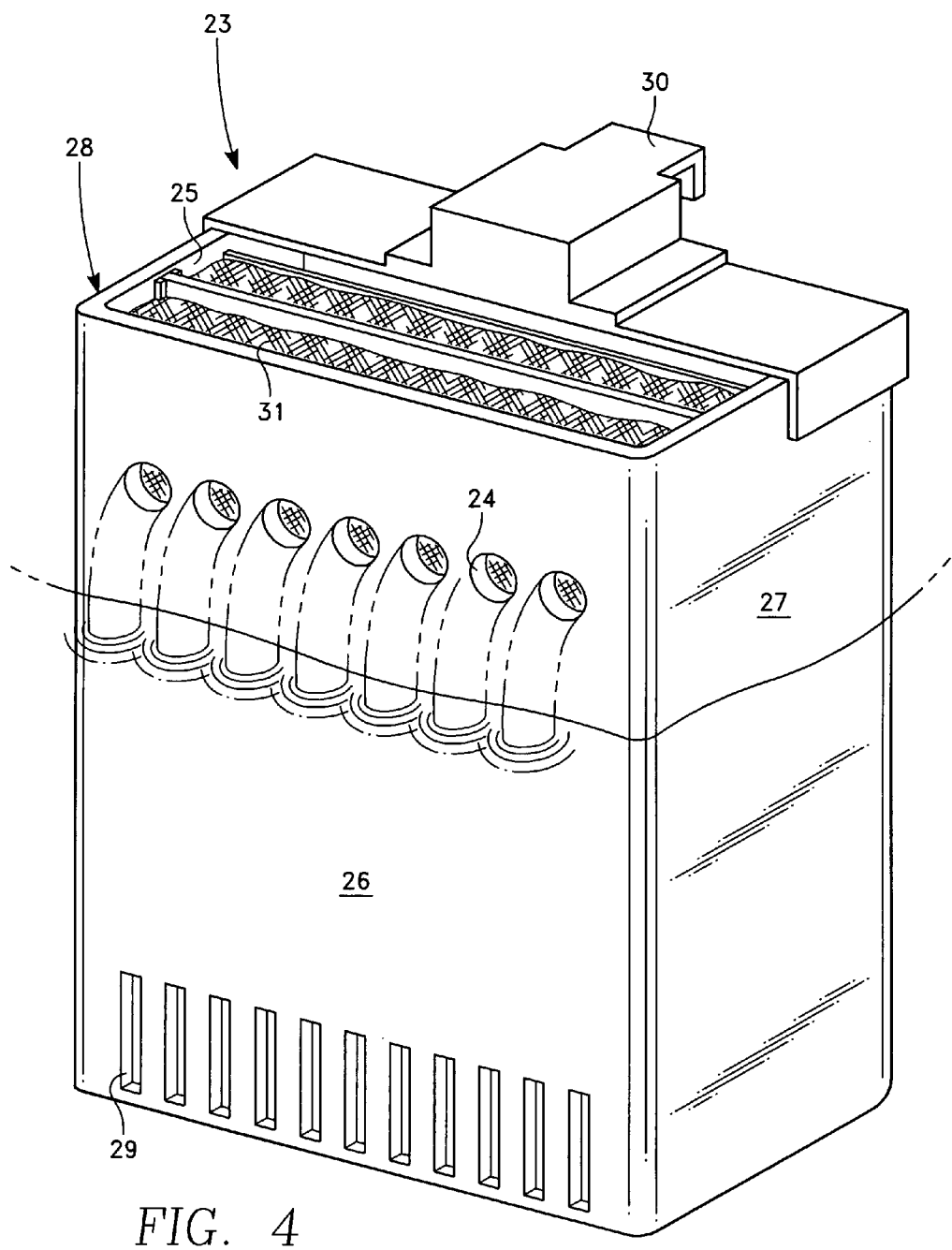
FIG. 4 is a perspective view of an alternate embodiment of the invention with only one row of return holes.

In FIG. 4, an alternate embodiment 23 shows one row of plurality of holes 24, which is contrast to FIG. 1, which shows the preferred embodiment having more than one row. On the larger filters shown in FIG. 1, the holes are arranged in multiple rows such that the surface tension causes the flows to intermingle and create a visually pleasing and agitated surface for the same purpose, as seen in FIG. 3.

The embodiment 23 in FIG. 4 has an outer casing 28 including an open top 25, a front wall 26, a left sidewall (not shown) and a right sidewall 27. In this embodiment the water intake 29 is a series of apertures rather than the tube found in FIG. 1. Also see in this figure is the hook 30 attached to the top 25 of the outer casing 28 that allows for easy attachment of the filter to an aquarium.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An improved filter for water removed from a reservoir containing life such as fish, animals, invertebrates and plants comprising an outer casing, said outer casing have a base, two sidewalls, a front wall, a back wall and an open top;
a pump located inside of said outer casing;
filter media located inside of said outer casing;
an inlet through which the power of said pump removes water from said reservoir for passage through said filter media inside of said outer casing; and
a first row of a plurality of apertures, each of said plurality of apertures being substantially congruent in size, located on said front wall and being substantially circular in shape wherein said filter is submerged in water in said reservoir except for said first row of apertures, which remain above said water in said reservoir and wherein said filter further comprises at least one more additional plurality of apertures which are also substantially circular in shape, each of said additional plurality of apertures being substantially congruent in size located parallel to said first row of plurality of apertures in an orientation such that said additional plurality of apertures are placed in a staggered position relative to said first row of a plurality of apertures wherein said additional apertures remain above said reservoir.

2. An improved filter as defined in claim 1 wherein said filter media is permanently affixed to said outer casing.

3. An improved filter as defined in claim 1 wherein said filter media includes one or more media taken from the group consisting of chemical media, biological media, mechanical media and ammonia adsorbing media.

4. An improved filter as defined in claim 1 wherein said plurality of apertures are aligned substantially vertically.

5. An improved filter as defined in claim 1 wherein said plurality of apertures are aligned substantially horizontally.

6. A method for filtering water from a reservoir containing life such as fish, animals, invertebrates and plants comprising the steps of:

locating said reservoir in a container having a bottom, four sidewalls and an open top;
filling of said reservoir with water up to a predetermined water line;
placement on one of said sidewalls a filter, said filter further comprising:
an outer casing, said outer casing having a base, two sidewalls, a front wall, a back wall and an open top;
a pump located inside of said outer casing;
filter media located inside of said outer casing;
an inlet through which the power of said pump removes water from said reservoir for passage through said filter media of said outer casing; and
a first row of a plurality of apertures, each of said plurality of apertures being substantially congruent in size, located on said wall and being substantially circular in shape;
wherein said filter is submerged in said water in said reservoir except for said first row of apertures which remain above said predetermined water line; and
begin filtering water through said media through activation of said pump wherein said filter further comprises at least one additional plurality of apertures, also substantially circular in shape, each of said additional plurality of apertures being substantially congruent in size located parallel to said first row of plurality of apertures in an orientation such that said additional plurality of apertures are placed in a staggered position relative to said first row of a plurality of apertures wherein said additional apertures remain above said reservoir.

7. The method as defined in claim 6 wherein said filter media is permanently affixed to said outer casing.

8. The method as defined in claim 6 wherein said filter media includes one or more media taken from the group consisting of chemical media, biological media, mechanical media and ammonia adsorbing media.

9. The method as defined in claim 6 wherein said plurality of apertures are aligned substantially vertically.

10. The method as defined in claim 6 wherein said plurality of apertures are aligned substantially horizontally.

* * * * *